United States Patent [19]

Chao

[11] Patent Number: 5,015,527

[45] Date of Patent: May 14, 1991

[54] INTERFACIAL EPOXY MICROCAPSULATION SYSTEM

[75] Inventor: Hung-Ya Chao, Williamsville, N.Y.

[73] Assignee: Moore Business Forms, Inc., Grand Island, N.Y.

[21] Appl. No.: 296,964

[22] Filed: Jan. 13, 1989

[51] Int. Cl.$^5$ .......................... B01J 13/16; B32B 27/38
[52] U.S. Cl. ................... 428/402.21; 264/4.7; 430/138; 427/213.34; 503/215
[58] Field of Search .......... 428/402.21, 402.22; 264/4.7; 503/215

[56] References Cited

U.S. PATENT DOCUMENTS

| | | | |
|---|---|---|---|
| 3,726,804 | 4/1973 | Matsukawa et al. | 264/4.7 |
| 3,796,669 | 3/1974 | Kiritani et al. | 428/402.21 |
| 3,864,275 | 2/1975 | Kan et al. | 264/4.7 |
| 3,928,230 | 12/1975 | Unsworth et al. | 427/213.34 |
| 3,943,063 | 3/1976 | Morishita et al. | 427/213.36 |
| 4,000,087 | 12/1976 | Maalouf | 428/402.21 |
| 4,016,099 | 4/1977 | Wellman et al. | 428/402.2 X |
| 4,049,604 | 9/1977 | Morehouse, Jr. et al. | 524/460 |
| 4,062,799 | 12/1977 | Matsukawa et al. | 428/402.2 X |
| 4,098,736 | 7/1978 | Li et al. | 428/402.2 X |
| 4,110,511 | 8/1978 | Lee et al. | 428/402.21 X |
| 4,137,343 | 1/1979 | Davis et al. | 427/150 |
| 4,139,392 | 2/1979 | Davis et al. | 428/402.2 X |
| 4,209,188 | 6/1980 | Chao et al. | 428/402.21 X |
| 4,228,031 | 10/1980 | Iwasaki et al. | 264/4.6 |
| 4,252,708 | 2/1981 | Newell | 523/440 |
| 4,495,509 | 1/1985 | Chao | 428/402.21 X |
| 4,520,091 | 5/1985 | Kakimi et al. | 428/402.2 X |
| 4,532,200 | 7/1985 | Arney et al. | 430/138 |
| 4,535,050 | 8/1985 | Adair et al. | 430/138 |
| 4,536,524 | 8/1985 | Hart et al. | 523/176 |
| 4,554,235 | 11/1985 | Adair et al. | 430/138 |
| 4,562,137 | 12/1985 | Sanders | 430/138 |
| 4,563,212 | 1/1986 | Becher et al. | 71/11 |
| 4,578,339 | 3/1986 | Adkins | 430/138 |
| 4,599,271 | 7/1986 | Chao | 428/402.21 |
| 4,626,471 | 12/1986 | Chao | 428/402.21 |
| 4,684,574 | 8/1987 | Pietsch et al. | 428/402.2 |
| 4,690,998 | 9/1987 | Wahle et al. | 528/96 |
| 4,708,812 | 11/1987 | Hatfield | 428/402.24 X |
| 4,785,048 | 11/1988 | Chao | 428/402 X |
| 4,937,167 | 6/1990 | Moffat et al. | 430/137 |

FOREIGN PATENT DOCUMENTS

| | | |
|---|---|---|
| 0002119 | 5/1979 | European Pat. Off. |
| 1091077 | 11/1967 | United Kingdom |
| 1091078 | 11/1967 | United Kingdom |
| 1511665 | 5/1978 | United Kingdom |
| 2135469 | 2/1983 | United Kingdom |

*Primary Examiner*—Richard D. Lovering
*Assistant Examiner*—John M. Covert
*Attorney, Agent, or Firm*—Finnegan, Henderson, Farabow, Garrett & Dunner

[57] ABSTRACT

An epoxy microcapsule comprising an oil core material and a microcapsule wall enclosing the oil core material. The microcapsule wall is an interfacial polymerization product of an epoxy resin and a polyamino compound having multifunctional amino groups capable of crosslinking the epoxy resin. The epoxy resin is preferably bisphenol A or bisphenol F based epoxy resin. The polyamino compound preferably has primary and tertiary amino groups. The epoxy microcapsule can be used in carbonless copying systems.

21 Claims, No Drawings

INTERFACIAL EPOXY MICROCAPSULATION SYSTEM

BACKGROUND OF THE INVENTION

The present invention relates to an epoxy microcapsule, an interfacial polymerization process of making the microcapsule, and the use of the microcapsule in a carbonless copying system. More particularly, the present invention relates to microcapsules having walls of low permeability and substantially no free unencapsulated oil that can be effectively used in a carbonless copying system to provide high quality images.

In a carbonless copying system, a plurality of substrates, e.g., paper sheets, are arranged in a manifold with each sheet having one or more coatings on its surface. The manifold is designed so that when external pressure, such as that caused by a typewriter, pen or other instrument, is applied to the outermost sheet, a colored image is formed on at least one surface of each sheet of the manifold.

Typically, microcapsules are used in such a carbonless copying system. For example, a coating of microcapsules is applied to the back surface of the top sheet of the manifold. The microcapsule contains an initially colorless chemically reactive color-forming dye precursor as the core or fill material. The front surface of the next sheet, which lies adjacent to the back surface of the top sheet, is coated with a material containing component, such as a phenolic resin or reactive clay, that is capable of reacting with the colorless dye precursor contained in the microcapsules to produce a color.

Thus, an external pressure on the front surface of the top sheet will rupture the microcapsules on the back surface and release the colorless dye precursor which then chemically reacts with the reactive component of the coated front of the adjacent sheet to produce a colored image corresponding to the area of pressure. Similarly, colored images are produced on each successive sheet of the manifold by the external pressure rupturing the microcapsules carried on the bottom surface of each sheet.

The quality of the colored images in the carbonless copying system depends, in part, on the quality of the microcapsules used to coat the surfaces of the sheets in the manifold. If the microcapsules have walls of relatively high permeability, the core material within the microcapsules passes through the microcapsule walls prior to the application of external pressure to rupture the microcapsules. This premature passage of the core material through the permeable microcapsule walls causes undesirable markings and discoloration to appear on the sheets of the manifold and results in insufficient core material being present within the microcapsule wall when pressure is applied to rupture the microcapsules.

Likewise, to enhance the resulting images in the carbonless copying system, it is desirable that, during the manufacture of the microcapsules, the amount of unencapsulated core material is minimized. Core material that is not encapsulated during the process of making the microcapsules is often wasted and will cause undesirable sheet discoloration on manifold, particularly Coated Front and Back (CFB) manifolds and self-contained products.

Thus, there is a need for microcapsules and a process of making microcapsules that are of relatively low permeability and which substantially lack free unencapsulated oil. There is also a need for a carbonless copying system that uses microcapsules having these properties.

SUMMARY OF THE INVENTION

The present invention can overcome these problems in the art. Specifically, the present invention can meet the advantages of providing microcapsules having walls of relatively low permeability and minimizing the amount of free unencapsulated oil core material. The microcapsules of the present invention can be effectively used in a carbonless copying system to provide images of high quality.

To overcome the problems in the art and achieve the advantages of the present invention, the invention, as embodied and broadly described herein, provides an epoxy microcapsule having an oil core material and a microcapsule wall enclosing the oil core material. The microcapsule wall is an interfacial polymerization product of an epoxy resin and a polyamino compound having multifunctional amino groups capable of crosslinking the epoxy resin.

The epoxy resin is preferably either bisphenol A based epoxy resin or bisphenol F based epoxy resin. The polyamino compound preferably has primary and tertiary amino groups.

The epoxy microcapsule can further include at least one of a flexible aliphatic epoxy resin and a high molecular weight polyamine in an amount effective to improve the impact resistance and prevent brittleness of the microcapsule wall. The high molecular weight polyamine is different than the polyamino compound used to form the microcapsule wall by interfacial polymerization.

The present invention further provides an interfacial polymerization process for making an epoxy microcapsule. In the process, an oil core material is mixed with a liquid epoxy resin to form an oil core phase. The oil core phase is then emulsified in an aqueous mixture of naphthalenesulfonate-formaldehyde and polyvinyl alcohol. A polyamino compound having multifunctional amino groups is added to the emulsification to crosslink the epoxy resin and form a microcapsule wall around the oil core material.

The epoxy microcapsules of the present invention can be used in a carbonless copying system. Such a system has a recording substrate, a first image-forming component, and a plurality of complementary image-forming components. For example, the first image-forming component is an acidic clay or phenolic resin and is carried by the recording substrate. Each complementary image-forming component is capable of reacting with the first image-forming component to produce a colored reaction product. Each complementary image-forming component is an epoxy microcapsule of the present invention.

The first image-forming component and the plurality of complementary image-forming components are arranged in juxtaposed contact with one another. When pressure is applied in selected areas of the carbonless copying system, a colored image forms on corresponding areas of the recording substrate.

The epoxy microcapsules of the present invention can overcome the problems in the art. These epoxy microcapsules have walls of low permeability so that the core material does not prematurely pass through the walls. Instead, the core material remains encapsulated within the walls until the microcapsule is ruptured during use. Moreover, the process of making these epoxy microcapsules minimizes the amount of unencapsulated oil core material. As a result, when the epoxy microcapsules of the present invention are used in a carbonless copying system, a high quality image results. The microcapsules are especially useful in a carbonless copying system that has self-contained configurations.

These and other objects, features, and advantages of the present invention will be made more apparent from the following description of the preferred embodiments.

DETAILED DESCRIPTION OF THE PREFERRED EMBODIMENTS

Reference will now be made in detail to the present preferred embodiments of the invention.

In accordance with the present invention, an epoxy microcapsule is provided having an oil core material and a microcapsule wall enclosing the oil core material. The oil core material can be readily selected by one skilled in the art depending upon the use of the microcapsule.

In one embodiment that is especially advantageous when the microcapsule is used in a carbonless copying system, the oil core material comprises a colorless dye precursor and an organic solvent for the dye precursor. Representative colorless dye precursors include, for example, crystal violet lactone, benzolyl leucomethylene blue, rhodamine lactam, the p-toluene sulfinate of Michler's hydrol, and any of the various chromogenic compounds that are capable of changing from a colorless to a colored form on contact with an acidic substance, such as a phenolic resin or a reactive clay.

Depending upon the colorless dye precursor used in the microcapsule, one skilled in the art can readily select an appropriate organic solvent for the dye precursor. Examples of such organic solvents include a solvent comprising diisopropylnaphthalene sold under the trademark KMC by Kureha Chemicals; an alkylated benzene sold under the trademark UCAN by Union Carbide Corp.; mono or dialkylated biphenyls, diarylmethanes, diarylethanes, trialkyltoluene, hydrogenated terphenyls, alkylated terphenyls, and chlorinated parafins.

When the microcapsule is not to be used in a carbonless copying system, the oil core material can be appropriately selected depending upon the use of the microcapsule. For example, the microcapsules can be used to encapsulate various oil core materials such as medicines, biological preparations, fertilizers, flavorings, deodorizers, adhesives, and xerographic toners. It should be understood that the present invention is not limited to carbonless copy applications for the microcapsules, but may be used wherever the use of microcapsules is beneficial.

In accordance with the present invention, a microcapsule wall encloses the oil core material. The microcapsule wall is an interfacial polymerization product of an epoxy resin and a polyamino compound having multifunctional amino groups capable of crosslinking the epoxy resin. A microcapsule wall formed by interfacial polymerization is significantly different than a microcapsule wall formed by other microencapsulation processes such as gelatin-gum arabic coacervation, melamine-formaldehyde/urea-formaldehyde condensation, interfacial polyamide, and interfacial polyurea.

Generally, in interfacial polymerization, the polymer wall is formed at the interface between an aqueous phase and an organic phase. One reactant for forming the wall is in the aqueous phase and the second reactant is in the organic phase. Upon contact of the aqueous phase and the organic phase, the two reactants form the polymer wall at the interface of the two phases.

In the present invention, the two reactants forming the microcapsule wall upon interfacial polymerization are an epoxy resin and a polyamino compound having multifunctional amino groups capable of crosslinking the epoxy resin. The epoxy resin is present in an organic phase and the polyamino compound is present in an aqueous phase to effectuate the interfacial polymerization.

Various epoxy resins known in the art can be used. Preferably, the epoxy resin is a bisphenol A based epoxy resin or a bisphenol F based epoxy resin. Bisphenol A has a formula of: $(C_6H_4OH)_2C(CH_3)_2$. Bisphenol F has a formula of: $(C_6H_4OH)_2CH_2$. Bisphenol A or F based epoxy resins with an equivalent weight in the range of about 158 to about 210 have good compatibility with the core materials for most applications. Examples of bisphenol A or F based epoxy resin include those obtained under the trademarks GY 6005, 6010, 6020, 2600 and 281 from Ciba-Geigy Corp; EPON 828 from Shell Chemical Co.; and EPOTUF 37-139 and 37-140 from Reichhold Chemicals, Inc.

A polyamino compound having multifunctional amino group is readily understood by one skilled in the art to mean compounds that contain multiple amino groups. Preferably, the polyamino compound has primary and tertiary amino groups. Examples of such polyamino compounds include 3,3'-diamino-N-methyldipropylamine (DADPA), bisaminopropylpiperazine (BAPP), bisaminoethylpiperazine (BAEP), and tris(2-aminoethyl)amine (TREN). Without being bound by theory, it is believed that the primary amino reacts with the epoxy resin and the tertiary amino catalyzes the epoxy ring opening polymerization. It has been discovered that polyamino compounds having multifunctional amino groups, such as DADPA, BAPP, BAEP, and TREN, provide superior results in the microcapsule wall than when polyamino compounds lacking such multifunctional amino groups are used.

Preferably, the microcapsule has a size within the range of about 1 micron to about 20 microns. The microcapsule wall is preferably about 8% to about 20% of the microcapsule.

In one embodiment of the microcapsule of the present invention, a co-emulsifier is incorporated. The co-emulsifier comprises polyvinyl alcohol (PVA) and naphthalenesulfonateformaldehyde (NSF). Preferably, the ratio of NSF to PVA is within the range of about 95:5 to about 80:20. During the microencapsulation reaction, fractions of the PVA and NSF molecules are attached to the microcapsule walls.

In one embodiment of the present invention, at least one of a flexible aliphatic epoxy resin and a high molecular weight polyamine is used in an amount effective to improve the impact resistance and prevent brittleness of the microcapsule wall. One skilled in the art would be able to readily select an appropriate flexible aliphatic epoxy resin or high molecular weight polyamine for use with a particular epoxy resin in the microcapsule wall.

Examples of useful flexible aliphatic epoxy resins include polyglycol diepoxide, such as ARALDITE GY 508 available from Ciba-Geigy Corp. Examples of high molecular weight polyamines include polyoxyalkyleneamine, polyamide resins based on dimerized fatty acid, and a polyamino compound such as ethylenediamine or diethylenetriamine. The flexible aliphatic epoxy resin and the polyamide resins are added only to the oil core phase in an amount with the range of 0.4% to 5% based on the core phase. The polyoxyalkylene amine is added to either the aqueous or oil core phases in an amount with the range of 0.4% to 5% based on the core phase.

The present invention also provides an interfacial polymerization process for making an epoxy microcapsule. In accordance with the present invention, an oil core material is mixed with a liquid epoxy resin to form an oil core phase. Preferably, the oil core material is a colorless dye precursor and an organic solvent for the dye precursor. The colorless dye precursors and organic solvents noted above can be used. The epoxy resin is preferably selected from bisphenol A based epoxy resin and bisphenol F based epoxy resin.

In accordance with the present invention, the oil core phase is emulsified in an aqueous mixture of naphthalenesulfonateformaldehyde (NSF) and polyvinyl alcohol (PVA). Preferably, the ratio of NSF to PVA is within the range of about 95:5 to about 80:20. Preferably, the NSF and PVA mixture is about 1.5 wt. % to about 15 wt. % of the oil core material. Most preferably, the NSF and PVA mixture is about 3 wt. % to about 9 wt. % of the oil core material.

Superior epoxy encapsulation is achieved by using a combined emulsifier of NSF and PVA for the emulsification of an epoxy resin, particularly bisphenol A or F based epoxy resin. If NSF is used alone, the resultant capsule often contains an excess amount of unencapsulated free oil in the slurry. Conversely, if PVA is used alone in the emulsifier, the free oil is eliminated, but the capsule wall is very permeable. Surprisingly, the combination of PVA and NSF as an emulsifier for the epoxy resin has resulted in a microcapsule wall of low permeability and the elimination of free unencapsulated oil.

The NSF can be in the form of a sodium salt such as sodium NSF salt condensates sold under the trademarks TAMOL L and TAMOL SN by the Rohm & Haas Co. or DAXAD by W.R. Grace & Co. The PVA is preferably made by hydrolyzing polyvinyl acetate. The PVA can be those sold under the trademarks VINOL 540, VINOL 523, and VINOL 205 by Air Products and Chemicals.

The emulsification can also include NSF with a protective colloid such as: a styrene/maleic anhydride copolymer such SCRIPSET 520 or 540 sold by the Monsanto Co.; poly(vinyl pyrrolidone); poly(styrenesulfonate) such as VERSA-TL 3 and VERSA-TL 500 available from the National Starch and Chemical Corp.; gelatins; poly(acrylic acid); acrylic acid copolymers such as poly(acrylamide-acrylic acid sodium salt); ethylene/maleic ahydride copolymers such as EMA 31 available from Monsanto Chemical Co.; and poly(vinyl methylether/maleic acid) such as GANTREZ 119 from GAF.

In accordance with the present invention, at least one of a flexible aliphatic epoxy resin and a polyamide resin can be added to the oil core phase. Alternatively, a polyoxyalkylene amine can be added to the aqueous emulsification or to the oil core phase. Preferably, the flexible aliphatic epoxy resin is polyglycol diepoxide. Preferably, the polyoxyalkylene amine is a flexible polyoxyeproplyleneamine, such as those sold under the trademarks JEFFAMINE D-2000, D-4000, and T-5000 by the Texaco Chemical Co. The polyglycol diepoxide can be the one sold under the trademark ARALDITE GY 508 by Ciba-Geigy Corp. Preferably, the flexible aliphatic epoxy resin, the polyamide resin, and the polyoxyalkylene amine are used within the range of about 0.4 wt. % to about 5.0 wt. % based on the oil core material.

In accordance with the present invention, a polyamino compound having multifunctional amino groups is added to the emulsification to crosslink the epoxy resin and form a microcapsule wall around the oil core material. Preferably, the polyamino compound has primary and tertiary amino groups as discussed above. These polyamino compounds are preferably selected from DADPA, BAPP, BAEP, and TREN.

It has been found that such polyamino compounds provide especially superior results in the formation of the microcapsule wall upon interfacial polymerization with the epoxy resin, particularly bisphenol A or F based epoxy resin. Without being bound by theory, it is believed that these polyamino compounds of the present invention react with the epoxy resin by curing with the primary amino groups and catalyzing the epoxy ring opening with the tertiary amino groups. When these polyamino compounds are incorporated in the formulation, they can be used at a concentration much lower than equivalent concentrations.

Preferably, during the addition of the multifunctional amino group to the emulsification, the emulsion has a solid content with the range of about 25 wt. % to about 50 wt. %. The solid content is more preferably within the range of about 36 wt. % to about 45 wt. %. The pH of the emulsification is preferably within the range of about 8.5 to about 12. The viscosity is preferably within the range of about 50 cps. to about 500 cps.

The epoxy microcapsules of the present invention can be used in a carbonless copy system. Such a system comprises a recording substrate, a first image-forming component, and a plurality of complementary image-forming components. Each complementary image-forming component is capable of reacting with the first image-forming component to produce a colored reaction product. Each complementary image-forming component is an epoxy microcapsule of the present invention as described above.

In the carbonless copy system, the first image-forming component and the plurality of complementary image-forming components are arranged in juxtaposed contact with one another. The application of pressure in selected areas upon the carbonless system causes a colored image to form on corresponding areas of the recording substrate. Preferably, the first image-forming component is an acidic clay or phenolic resin and is carried by the recording substrate.

In testing the quality of the microcapsules prepared according to the present invention, a microcapsule slurry is mixed with a reactive phenolic resin at about a 1:2 ratio of active capsule to resin. The mixed slurry is then coated on a paper substrate at about 4 g/m$^2$ coating weight to become a self-contained sheet. This coated sheet is then placed in a 150° C. temperature oven for 15 minutes. Any discoloration on the sheet is quantitatively measured using a conventional image analyzer, such as a BNL-2 opacimeter. A white sheet with a reading of 100 would indicate that the capsules are totally impermeable, A highly discolored sheet with a reading of 25–50 would indicate a rather porous capsule. Any reading beyond 75 is considered excellent. Capsules made by the current invention are suitable for multiple manifold CFB applications as well as for self-contained applications.

The following examples illustrate and do not limit the present invention.

EXAMPLES

EXAMPLE NO 1

63 parts of a 5% colorless dye in KMC solution/5.92 parts of ARALDITE 6010 mixture were emulsified in 130 parts, 3% of aqueous TAMOL L/VINOL 523 (95/5) solution. 1.14 parts of DADPA (3,3'diamino-N-methyldipropylamine) in 5 parts of water were added. The slurry was heated to 80° C. for ½ to 4 hours. By this time, microcapsule formation was completed. The particle size of the microcapsules was about 6 microns.

The process was repeated except that the emulsification agent TAMOL/PVA was replaced by a straight Vinol 523 solution.

The capsules were tested in two ways: [1] each slurry was mixed with a proper amount of a reactive phenolic resin slurry, coated, and evaluated according to the procedures described above using a BNL-2 opacimeter; [2] CB imaging capacity was evaluated by placing a CB sheet in a 150° C. temperature oven for 15 minutes and then imaging the CB sheet against a phenolic resin coated receiving sheet.

In the first test in which the microcapsules are self-contained, a reading of 100 would indicate that the capsules are totally impermeable. Any reading beyond 75 is considered excellent. In the CB imaging test, a typical reading of 40 to 50 is considered acceptable with a lower reading being better. The results of the two tests are as follows.

|               | Self-Contained |           | CB Imaging Capacity |           |
|---------------|----------------|-----------|---------------------|-----------|
| Encapsu. Time | Tamol L/PVA    | PVA Alone | Tamol/PVA           | PVA Alone |
| ½ hr.         | 33.0           | black     | None                | None      |
| 1 hr.         | 77.0           | black     | 38.9                | None      |
| 1½ hrs.       | 84.9           | black     | 34.0                | None      |
| 2 hrs.        | 89.0           | black     | 33.9                | None      |
| 3 hrs.        | 91.6           | black     | 34.0                | None      |
| 4 hrs.        | 91.0           | 60.00     | 33.5                | None      |

It is concluded that TAMOL/PVA capsules produced superior results.

EXAMPLE NO. 2

63 parts of a 5% colorless dye in KMC solution/6.41 parts of ARALDITE 6010 mixture were emulsified in 130 parts of 3% aqueous TAMOL L/Vinol 523 (at various ratios) solution. 0.59 part of BAPP in 5 parts of water was added. The slurries were heated to 60° C. for 2 ∝ 5 hours. The microcapsules prepared were about 6 microns. The same tests as described in Example No. 1 were performed. The following results were obtained.

| Encaps. Time (Hours) | Self-Contained (Tamol L/PVA) |      |       |       | CB Imaging Capacity (Tamol/PVA) |      |       |       |
|---|-------|------|------|------|------|------|------|------|
|   | 100/0 | 95/5 | 90/10 | 0/100 | 100/0 | 95/5 | 90/10 | 0/100 |
| 2 | 76.9  | 36.5 | 28.9 | 31.0 | none | none | none | none |
| 3 | 90.1  | 78.5 | 43.8 | 30.7 | good | fair | none | none |
| 4 | 89.0  | 81.3 | 55.4 | 30.1 | good | fair | none | none |
| 5 | 89.2  | 83.0 | 60.3 | 32.4 | good | good | fair | none |

Although the NSF alone produced good results, free unencapsulated oil was present in the capsule slurry. Conversely, the mixture of NSF/PVA produced better results and substantially no free unencapsulated oil was present in the capsule slurry.

EXAMPLE NO. 3

The core material was the same as in Ex. No. 1. The encapsulation procedures was similar to Ex. No. 1, except that TREN was used to replace DADPA as the polyamino compound. TAMOL L/VINOL 523 at 95/5 ratio was used as the emulsification agent. The results are as follows:

| Encapsu. Time | Self-Contained | CB Imaging Capacity |
|---|---|---|
| ½ hr.  | 29.0 | None |
| 1 hr.  | 55.0 | 59.3 |
| 1½ hr. | 91.0 | 37.6 |
| 2 hrs. | 92.3 | 31.5 |
| 3 hrs. | 93.0 | 32.4 |

EXAMPLE NO. 4

This example illustrates that BAPP can be used at a wide concentration range without affecting the efficiency of encapsulation. The core material was the same as in Ex. 1. TAMOL L/PVA at 95/5 was used as emulsification agent. The encapsulation was conducted at 80° C.

|              | Self-Contained Encapsu. Time (hrs.) | | | | CB Imaging Capacity Encapsu. Time (hrs.) | | | |
|--------------|------|------|------|------|------|------|------|------|
| Araldite/BAPP | 2   | 3    | 4    | 4.5  | 2    | 3    | 4    | 4.5  |
| 5.58/1.48    |      | 89.2 |      | 89.9 |      | Good |      | Good |
| 5.58/1.77    |      | 87.6 |      | 89.5 |      | Good |      | Good |
| 5.58/2.07    |      | 91.0 |      | 91.2 |      | Good |      | Good |
| 5.58/1.18    |      | 91.3 |      | 90.6 |      | Good |      | Good |
| 6.18/0.89    | 87.9 |      | 87.0 |      | Good |      | Good |      |

-continued

| Araldite/BAPP | Self-Contained Encapsu. Time (hrs.) | | | | CB Imaging Capacity Encapsu. Time (hrs.) | | | |
|---|---|---|---|---|---|---|---|---|
| | 2 | 3 | 4 | 4.5 | 2 | 3 | 4 | 4.5 |
| 6.48/0.59 | 90.2 | | 89.0 | | Good | | Good | |
| 6.77/0.30 | 61.1 | | 77.0 | | Fair | | Good | |
| 6.92/0.15 | 40.8 | | 65.0 | | None | | Poor | |

EXAMPLE NO. 5

This example illustrates that DADPA and TREN can be used at a wide concentration range without affecting the efficiency of encapsulation. The core material was the same as in Ex. 1. TAMOL L/VINOL 523 at 95/5 was used as emulsification agent. The encapsulation was conducted at 80° C. for four hours.

| Amine | Araldite/Amine | Self-Contained |
|---|---|---|
| DADPA | 6.09/1.43 | 92.8 |
| | 6.16/0.95 | 92.5 |
| | 6.39/0.71 | 91.0 |
| TREN | 6.09/0.96 | 90.4 |
| | 6.41/0.64 | 93.4 |
| | 6.57/0.48 | 92.0 |

EXAMPLE NO. 6

TAMOL L was combined with various protecting colloids (in a 95/5 ratio) for emulsification purposes. 130 parts of 3% combined solution was used in each case. The core and wall materials were the same as in Ex. No. 2. The encapsulation was conducted at 80° C. for 2-4 hours.

The microcapsules were tested using the self-contained procedure of Ex. No. 1. The following results were obtained.

| Protecting Colloid | Encapsu. Time | Self-Contained |
|---|---|---|
| VINOL 540 | 3 hrs. | 89.9 |
| Pig Skin Gelatin | 3 hrs. | 84.0 |
| GANTREZ 119 | 3 hrs. | 85.0 |
| SCRIPSET 520 | 4 hrs. | 85.9 |
| PVP | 2 hrs. | 85.1 |
| Calf Skin Gelatin | 3 hrs. | 88.0 |
| PAAS* | 2 hrs. | 88.2 |
| PSS* | 3 hrs. | 89.4 |

*PAAS = poly(acrylamide-acrylic acid sodium salt)
PSS = poly(styrene sulfonate sodium salt)

EXAMPLE NO. 7

Example No. 1 was repeated except that KMC oil was replaced by a 1:1 mixture of KMC:UCAN. (UCAN is an alkylated benzene commercially available from Union Carbide). The heated self-contained sheet had a BNL reading of 89.4.

EXAMPLE NO. 8

The core material used in this example was the same as in Ex. 1. 4.88 parts of ARALDITE 6010 and 0.8 part of ARALDITE 508 were dissolved in the oil core phase. The resulting material was emulsified in 130 parts of 3% aqueous TAMOL L/VINOL 523 (at 90/10 ratio) solution. 1.39 parts of BAPP in 5 parts water was added into the emulsion. The slurry was heated to 75° C. for 4 hours. The microcapsules were about 5 microns.

The microcapsules were tested using the self-contained test of Ex. No. 1. The self-contained sheet after heating at 150° C. for 15 minutes had a BNL reading of 88.0.

EXAMPLE NO. 9

The core material used in this example was the same as in Ex. 1. 4.31 parts of ARALDITE 6010 and 1.74 parts of JEFFAMINE T-5000 (which is a polyoxypropyleneamine sold by Texaco Chemicals) were dissolved in the oil core phase. The resulting material was emulsified in 130 parts of 3% aqueous TAMOL L/VINOL 523 (at 90/10 ratio) solution. 1.04 parts of BAPP in 5 parts of water were added into the emulsion. The slurry was heated to 75° C. for 4 hours. The microcapsules had a size of about 5 microns.

The self-contained test of Ex. No. 1 was used to evaluate the microcapsules. After heating at 150° C. for 15 minutes, a self-contained sheet of the microcapsules had a BNL reading of 90.9.

EXAMPLE NO. 10

The core material used in this example was the same as in Ex. 1. 4.49 parts of Araldite 6010 and 1.54 parts of JEFFAMINE D-2000 (which is a polyoxypropyleneamine sold by Texaco Chemicals) were dissolved in the oil core phase. The resulting material was emulsified in 130 parts of 3% aqueous TAMOL L/VINOL 523 (at 90/10 ratio) solution. 1.04 parts of BAPP in 5 parts of water were added into the emulsion. The slurry was heated to 75° C. for 4 hours. The microcapsules had a particle size of about 5 microns. Using the test of Ex. No. 1, a self-contained sheet of the microcapsules had a BNL reading of 85.0 after heating at 150° C. for 15 minutes.

EXAMPLE NO. 11

The core material used in this example was the same as in Ex. 1. 5.14 parts of ARALDITE 6010 and 0.60 parts of JEFFAMINE D-4000 (which is a polyoxypropyleneamine sold by Texaco Chemicals) were dissolved in the oil core phase. The resulting material was emulsified in 130 parts of 3% aqueous TAMOL L/VINOL 523 (at 90/10 ratio) solution. 1.34 parts of BAPP in 5 parts of water were added into the emulsion. The slurry was heated to 75° C. for 4 hours. The particle size of the microcapsules was about 5.5 microns. Using the test of Ex. No. 1, a self-contained sheet of the microcapsules had a BNL reading of 92.0 after heating at 150° C. for 15 minutes.

EXAMPLE NO. 12

The core material used in this example was the same as in Ex. 1. 8.56 parts of ARALDITE 281 and 0.84 part of JEFFAMINE D-2000 were dissolved in the oil core phase. The resulting material was emulsified in 130 parts of 3% aqueous TAMOL L/VINOL 523 (at 90/10 ratio) solution. 1.80 parts of DADPA in 5 parts of water was added into the emulsion. The slurry was heated to 75° C. for 4 hours. The particle size of the microcapsules was about 5.7 microns. Using the test of Ex. No. 1, a self-contained sheet of the microcapsules had a BNL reading of 89.3 after heating at 150° C. for 15 minutes.

EXAMPLE NO. 13

The core material used in this example was the same as in Ex. 1. 5.44 parts of ARALDITE 281 was dissolved in the oil core phase. The resulting material was emulsified in 130 parts of 3% aqueous TAMOL L/VINOL 523 (at 90/10 ratio) solution. 1.64 parts of BAPP in 5 parts of water were added into the emulsion. The slurry was heated to 75° C. for 4 hours. The particle size of the microcapsules was about 4.7 microns. Using the test of Ex. No. 1, a self-contained sheet of the microcapsules aged at 150° C. for 15 minutes had a BNL reading of 92.0.

It will be apparent to those skilled in the art that various modifications and variations can be made in the present invention without deviating from the scope or spirit of the invention. Thus, it is intended that the present invention covers the modifications and variations of this invention provided that they come within the scope of the following claims or their equivalents.

What is claimed is:

1. An epoxy microcapsule comprising:
   (a) an oil core material; and
   (b) a microcapsule wall enclosing the oil core material, the microcapsule wall being an interfacial polymerization product of:
   (i) an epoxy resin, and
   (ii) a polyamino compound having primary and tertiary amino groups capable of crosslinking the epoxy resin.

2. The epoxy microcapsule of claim 1, wherein the epoxy resin is selected from the group consisting of bisphenol A based epoxy resin and bisphenol F based epoxy resin.

3. The epoxy microcapsule of claim 1, wherein the polyamino compound is selected from the group consisting of 3,3'-diamino-N-methyl-dipropylamine, bisaminopropylpiperazine, bisaminoethylpiperazine, bisaminoethylpiperazine, and tris(2-aminoethyl)amine.

4. The epoxy microcapsule of claim 1, wherein the oil core material comprises:
   (i) a colorless dye precursor, and
   (ii) an organic solvent for the dye precursor.

5. The epoxy microcapsule of claim 1, wherein the microcapsule has a size within the range of about 1 micron to about 20 microns.

6. The epoxy microcapsule of claim 1, wherein the microcapsule wall is about 8% to about 20% of the microcapsule.

7. The epoxy microcapsule of claim 1, further comprising a co-emulsifier attached to the microcapsule wall, the co-emulsifier comprising polyvinyl alcohol and naphthalenesulfonate-formaldehyde.

8. The epoxy microcapsule of claim 7, wherein the ratio of naphthalenesulfonate-formaldehyde to polyvinyl alcohol is within the range of about 95:5 to about 80:20.

9. The epoxy microcapsule of claim 1, the microcapsule wall further comprising at least one of a flexible aliphatic epoxy resin and a high molecular weight polyamine in an amount effective to improve the impact resistance and prevent brittleness of the microcapsule wall.

10. The epoxy microcapsule of claim 9, wherein the flexible aliphatic epoxy resin is polyglycol diepoxide.

11. The epoxy microcapsule of claim 9, wherein the high molecular weight polyamine is selected from the group consisting of polyoxyalkyleneamine and polyamide resins.

12. An epoxy microcapsule comprising:
   (a) an oil core material comprising:
   (i) a colorless dye precursor, and
   (ii) an organic solvent for the colorless dye precursor;
   (b) a microcapsule wall enclosing the oil core material, the microcapsule wall being the interfacial polymerization product of:
   (i) an epoxy resin selected the group consisting of bisphenol A based epoxy resin F based epoxy resin; and
   (ii) a polyamino compound having primary and tertiary amino groups capable of crosslinking the epoxy resin.

13. The epoxy microcapsule of claim 12, wherein the polyamino compound is selected from the group consisting of 3,3'-diamino-N-methyl-dipropylamine, bisaminopropylpiperazine, bisaminoethylpiperazine, and tris(2-aminoethyl)amine.

14. The epoxy microcapsule of claim 13, further comprising a co-emulsifier attached to the microcapsule wall, the co-emulsifier comprising polyvinyl alcohol and naphthalenesulfonate-formaldehyde.

15. The epoxy microcapsule of claim 12, further comprising a co-emulsifier attached to the microcapsule wall, the co-emulsifier comprising polyvinyl alcohol and naphthalenesulfonate-formaldehyde.

16. The epoxy microcapsule of claim 14, the microcapsule wall further comprising at least one of a flexible aliphatic epoxy resin and a high molecular weight polyamine in an amount effective to improve the impact resistance and prevent brittleness of the microcapsule wall.

17. The epoxy microcapsule of claim 12, the microcapsule wall further comprising at least one of a flexible aliphatic epoxy resin and a high molecular weight polyamine in an amount effective to improve the impact resistance and prevent brittleness of the microcapsule wall.

18. An epoxy microcapsule characterized by being capable of being formed by a process comprising the steps of:
   (a) mixing an oil core material with a liquid epoxy resin to form an oil core phase;
   (b) emulsifying the oil core phase in an aqueous mixture of naphthalenesulfonate-formaldehyde and polyvinyl alcohol; and
   (c) adding a polyamino compound having primary and tertiary amino groups to the emulsification to crosslink the epoxy resin and form a microcapsule wall around the oil core material.

19. The epoxy microcapsule of claim 18 wherein the polyamino compound is selected from the group consisting of 3,3'-diamino-N-methyl-dipropylamine, bisaminopropylpiperazine, bisaminoethylpiperazine and tris(2-aminoethyl)amine.

20. The epoxy microcapsule of claim 18 further comprising the step of adding to the oil core phase at least one of a flexible aliphatic epoxy resin and a polyamide resin.

21. The epoxy microcapsule of claim 18 further comprising the step of adding to either the aqueous emulsification or the oil core phase a polyoxyalkylene amine.

* * * * *